US012537328B2

(12) United States Patent
Storch et al.

(10) Patent No.: US 12,537,328 B2
(45) Date of Patent: Jan. 27, 2026

(54) FORCE DISTRIBUTING SPRING CONTACTS

(71) Applicant: Google LLC, Mountain View, CA (US)

(72) Inventors: David Robert Storch, Chicago, IL (US); Robert Hrabchak, Chicago, IL (US)

(73) Assignee: Google LLC, Mountain View, CA (US)

( * ) Notice: Subject to any disclaimer, the term of this patent is extended or adjusted under 35 U.S.C. 154(b) by 344 days.

(21) Appl. No.: 18/306,822

(22) Filed: Apr. 25, 2023

(65) Prior Publication Data

US 2023/0261408 A1 Aug. 17, 2023

Related U.S. Application Data

(60) Provisional application No. 63/497,939, filed on Apr. 24, 2023.

(51) Int. Cl.
*H01R 13/24* (2006.01)

(52) U.S. Cl.
CPC ..... *H01R 13/2442* (2013.01); *H01R 13/2464* (2013.01)

(58) Field of Classification Search
CPC ............ H01R 13/2442; H01R 13/2464; H01R 13/6581; H01R 12/7076; H01R 12/57; H01R 12/714; H01L 24/72
USPC ............................................................ 439/83
See application file for complete search history.

(56) References Cited

U.S. PATENT DOCUMENTS

| | | | | |
|---|---|---|---|---|
| 5,152,695 A * | 10/1992 | Grabbe | H01R 12/714 | 439/71 |
| 2003/0015347 A1* | 1/2003 | Eldridge | H01R 13/2407 | 174/260 |
| 2003/0214045 A1* | 11/2003 | Lahiri | H01L 21/4853 | 257/761 |
| 2005/0042891 A1 | 2/2005 | Hein et al. | | |

(Continued)

OTHER PUBLICATIONS

Jin, Suying, "Flip Sapphire Light-Emitting Diode (LED) Chip Package", Technical Disclosure Commons—https://www.tdcommons.org/dpubs_series/6328, Oct. 18, 2023, 9 pages.

(Continued)

*Primary Examiner* — Christopher M Koehler
*Assistant Examiner* — Gregory L Mangot
(74) *Attorney, Agent, or Firm* — Colby Nipper PLLC

(57) ABSTRACT

This document describes techniques and apparatuses directed to force distributing spring contacts. The disclosed spring contacts electrically connect a first component to a second component within a computing device. In implementations, the computing device includes a spring contact having a flexure coupled to a contact pin and configured to apply a force to the second component through the contact pin. The contact pin can include a small or precise structure configured to provide a precise electrical connection to the second component. However, the force to the second component through the small or precise structure of the contact pin increases an applied pressure, which can damage the second component. The disclosed techniques and apparatuses describe force distributing spring contacts with a force distributor configured to distribute the force to the second component over a larger surface area, thereby decreasing the applied pressure and preventing damage to the second component.

15 Claims, 4 Drawing Sheets

(56) References Cited

U.S. PATENT DOCUMENTS

| | | | | |
|---|---|---|---|---|
| 2009/0081889 | A1* | 3/2009 | Ramaswamy | H01R 12/714 439/59 |
| 2013/0029538 | A1* | 1/2013 | Ihara | H01R 13/2442 439/733.1 |
| 2013/0157481 | A1* | 6/2013 | Soo | H01R 12/57 439/83 |
| 2014/0273641 | A1 | 9/2014 | Light et al. | |
| 2015/0014729 | A1 | 1/2015 | Ito et al. | |
| 2015/0050760 | A1 | 2/2015 | Imazu et al. | |
| 2016/0099389 | A1 | 4/2016 | Tischler | |
| 2017/0233610 | A1 | 8/2017 | Kim et al. | |
| 2021/0296805 | A1 | 9/2021 | Meer et al. | |
| 2022/0320045 | A1 | 10/2022 | Chang et al. | |
| 2023/0156917 | A1* | 5/2023 | Taylor | H01R 12/00 174/261 |

OTHER PUBLICATIONS

"2.30mm SMT Spring Contact (T+R) SMT Spring Contact", Retrieved at: https://www.harwin.com/products/S7081-42R/—on Mar. 7, 2023, 6 pages.

"Interface Pin Blocks—Brochure", Retrieved at: https://www.ptr-hartmann.com/fileadmin/media/downloads/Broschueren/eng/PTR-HARTMANN-Brochure-Spring-Loaded-Connectors.pdf—on Mar. 6, 2023, 16 pages.

"Secure Connection—Spring—Loaded Connectors", Retrieved at; https://www.ptr-hartmann.com/know-how/spring-loaded-connectors/—on Mar. 6, 2023, 7 pages.

"Spring Finger Type : Box-Clip", Retrieved at: https://www.te.com/usa-en/product-1746136-1.html—on Mar. 7, 2023, 5 pages.

"Spring Finger Type : C-Clip", Retrieved at: https://www.te.com/usa-en/product-2199248-6.html—on Mar. 7, 2023, 4 pages.

Ding, et al., "Reducing Internal Electronic Noise in Electronic Devices", Technical Disclosure Commons, https://www.tdcommons.org/dpubs_series/7170, Jul. 14, 2024, 11 pages.

* cited by examiner

FORCE DISTRIBUTING SPRING CONTACTS

CROSS-REFERENCE TO RELATED APPLICATION(S)

This application claims priority to U.S. Provisional Application Ser. No. 63/497,939, filed Apr. 24, 2023, the disclosure of which is incorporated herein by reference in its entirety.

SUMMARY

This document describes techniques and apparatuses directed to force distributing spring contacts. The disclosed spring contacts electrically connect a first component to a second component within a computing device. In implementations, a spring contact has a base, a flexure coupled to the base, and a contact pin coupled to the flexure. The spring contact is affixed to the first component via the base and is configured to apply a force to the second component through the contact pin. The contact pin can include a structure configured to provide a precise electrical connection to the second component. The disclosed techniques and apparatuses describe force distributing spring contacts with a force distributor configured to distribute the force to the second component over a larger surface area, thereby decreasing the applied pressure and preventing damage to the second component.

This Summary is provided to introduce simplified concepts of force distributing spring contacts, which are further described in the Detailed Description and are illustrated in the Drawings. This Summary is not intended to identify essential features of the claimed subject matter, nor is it intended for use in determining the scope of the claimed subject matter.

BRIEF DESCRIPTION OF THE DRAWINGS

The details of one or more aspects of force distributing spring contacts are described in this document with reference to the following drawings.

DETAILED DESCRIPTION

Overview

Figure 1:
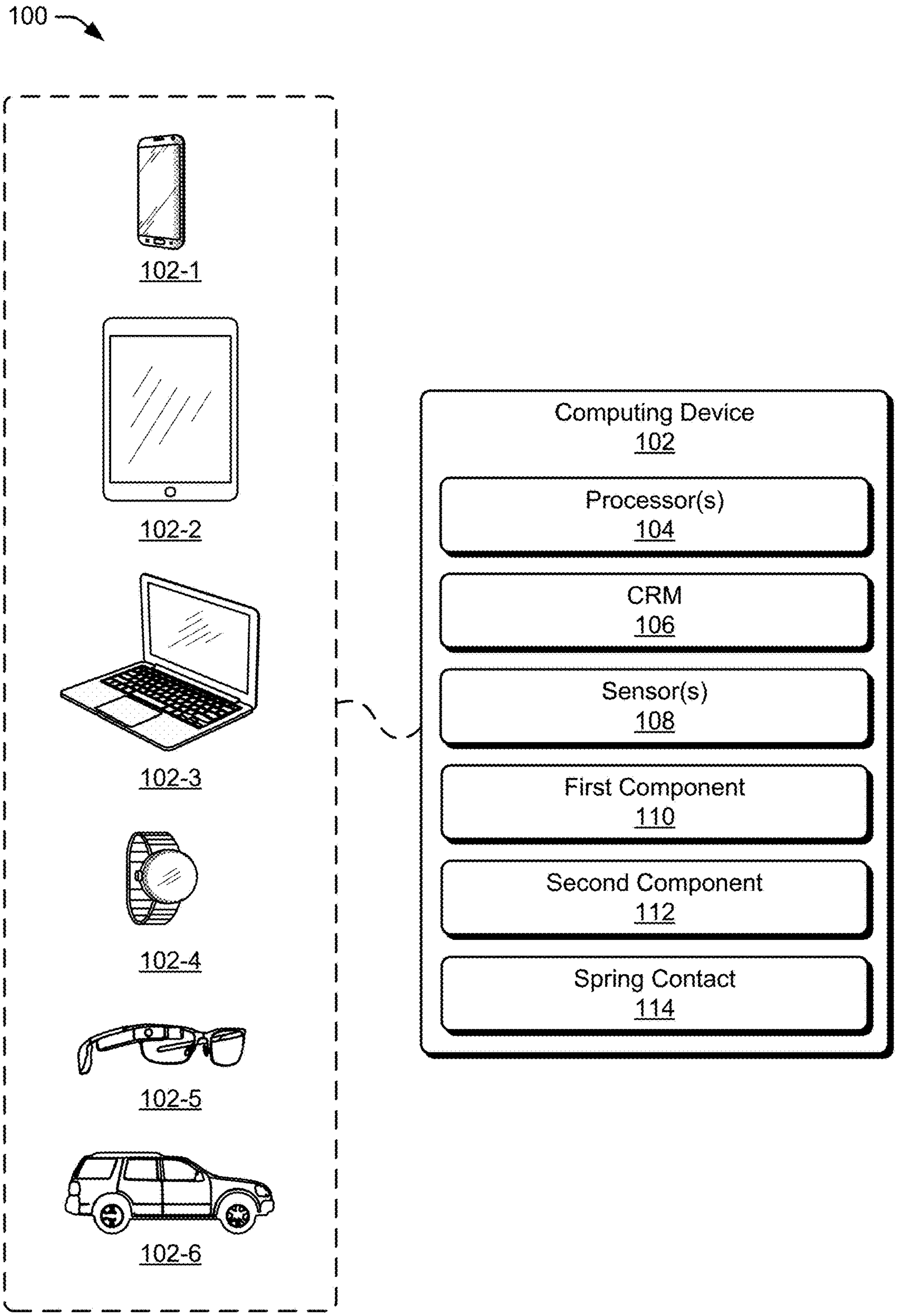
FIG. 1 illustrates an example implementation of a computing device.

When an electrical connection is required between two components of a computing device, it is not always possible to make the electrical connection using a hard connection (e.g., a wire, a trace, solder). For example, using a wire to ground a display module within a computing device (e.g., a smartphone, a tablet) may not be possible because the wire can take up space or crumple into an unintended shape or position when the display module is incorporated in the computing device. As another example, using solder to ground the display module within the computing device may not be possible because access to a ground plane or a rear (e.g., not facing a user) side of the display is blocked.

In such scenarios, flexible contacts (e.g., spring contacts) can be used. A spring contact is configured to maintain an operable coupling between a first component and a second component via a spring force. Often, the spring contact includes a structure (e.g., a dome, a sharp point) configured to make a precise electrical connection (e.g., the operable coupling) to the second component. However, under some environmental or tolerance load conditions, the spring force applied to the second component through the structure increases an applied pressure, which can damage the second component.

The disclosed techniques and apparatuses are directed to force distributing spring contacts configured to prevent damage to the second component by including a force distributor configured to distribute the force to the second component over a larger surface area, thereby decreasing the pressure applied. In aspects, a spring contact includes a base configured to operably couple the spring contact to a first component, at least one flexure coupled to the base, a force distributor coupled to the at least one flexure, and a contact pin coupled to the at least one flexure and configured to operably couple the spring contact to a second component. The force distributor and the contact pin may be coupled to the at least one flexure on a side opposite of the base.

The operable coupling of the base and the first component can be any one of a variety of connections, including a welded connection, a soldered connection, a press-fit connection, a fastened connection (e.g., by a fastener, by a screw), and so forth. The operable coupling of the contact pin and the second component can be a precise, pressure-based connection to the second component by including a structure (e.g., a point, a dome) on the contact. Additionally, or alternatively, the contact, and the structure thereof, can be coated in a layer of electrically conductive material (e.g., copper, titanium, gold, aluminum, iron, an alloy thereof).

In aspects, the base, the at least one flexure, and the contact pin are formed of electrically conductive materials. Therefore, an electrical connection can be made from the first component through the base, the flexure, and the contact pin to the second component. The electrical connection can include grounding, antenna signals, display signals, circuit signals generally (e.g., power, timing, data), and the like.

In addition to being conductive, the flexure is also configured to apply a spring force to the second component through the contact. The flexure can be shaped into a spring (e.g., helical compression spring, a conical spring, a torsion spring, a laminated spring, a leaf spring, a disc spring, and so forth). The spring force applied to the second component through the contact pin maintains the electrical connection from the first component through the spring contact to the second component.

In other aspects, the force distributor is not electrically conductive (e.g., insulative) so that the precise connection to the second component is maintained through the contact. The force distributor may be formed of any one of a variety of insulative materials, including plastic, foam, rubber, or composites thereof. Additionally, or alternatively, the force distributor may be a same conductive material as the base, the flexure, or the contact pin but coated by an insulative material or laminate, including plastic, paint, anodization, and so forth. Furthermore, the insulative material can be soft or rigid, depending on mechanical or industrial design considerations.

In addition to being non-conductive, the force distributor also includes a surface area larger than a surface area of the contact. When a force applied is larger than necessary to maintain the electrical connection between the contact pin and the second component, the force distributor may contact the second component. The larger surface area of the force distributor compared to the surface area of the contact pin allows for excess force to be distributed over the larger surface area. By so doing, the force distributor reduces a pressure exerted on the second component, protecting the second component from damage.

Example Implementations

The following discussion describes example implementations, techniques, apparatuses that may be employed in the example implementations, and various devices in which components of a force distributing spring contact can be embodied. In the context of the present document, reference is made to the following by way of example only.

FIG. 1 illustrates an example implementation 100 of a computing device 102 having a force distributing spring contact 114. The computing device 102 is illustrated as a variety of example computing devices, including consumer electronic devices. As non-limiting examples, the computing device 102 can be a smartphone 102-1, a tablet 102-2, a laptop computer 102-3, a smartwatch 102-4, a pair of smart glasses 102-5, or an automotive vehicle 102-6. Although not shown, the computing device 102 can also be an audio recording device, a home automation system, a gaming console, a personal media device, a drone, a home appliance, and so forth. The computing device 102 can be wearable, non-wearable but mobile, or relatively immobile, such as a desktop computer or a home appliance. Further, the computing device may include additional components omitted from FIG. 1 for the sake of clarity.

FIG. 1 further illustrates that the computing device 102 can include one or more processors 104 and computer-readable media 106 (CRM 106). The processors 104 may include one or more of any appropriate single-core or multi-core processor (e.g., a graphics processing unit, a central processing unit). The CRM 106 may include one or more non-transitory storage devices including dynamic random-access memory, flash memory, a solid-state drive, a magnetic spinning drive, or any type of storage or memory media suitable for storing electronic instructions. The computing device 102 also includes one or more of a variety of sensors 108, such as an accelerometer, a barometer, an ambient light sensor, a moisture sensor, and the like.

In aspects, the computing device further includes a first component 110, a second component 112, and the spring contact 114. The first component 110 and/or the second component 112 can be a component of a computing device (e.g., an electronic component, a display module, a display panel, an antenna, a radio, a printed circuit board (PCB), a motherboard, a grounding plane (e.g., a conductive housing of a computing device), a battery, a subscriber identity module, a processor, a memory device, a storage device, and so forth). The spring contact 114 is configured to operably couple the first component 110 to the second component 112. The spring contact 114 can operably couple to the first component 110 via a welded connection, a soldered connection, a press-fit connection, a screwed connection, and so forth. The spring contact 114 may operably couple to the second component 112 via a pressure connection (e.g., by a spring force exerted by the spring contact 114). In some aspects, the spring contact 114 is electrically conductive, so that the operable coupling between the first component 110 and the second component 112 can be electrical (e.g., display module grounding).

Figure 2:
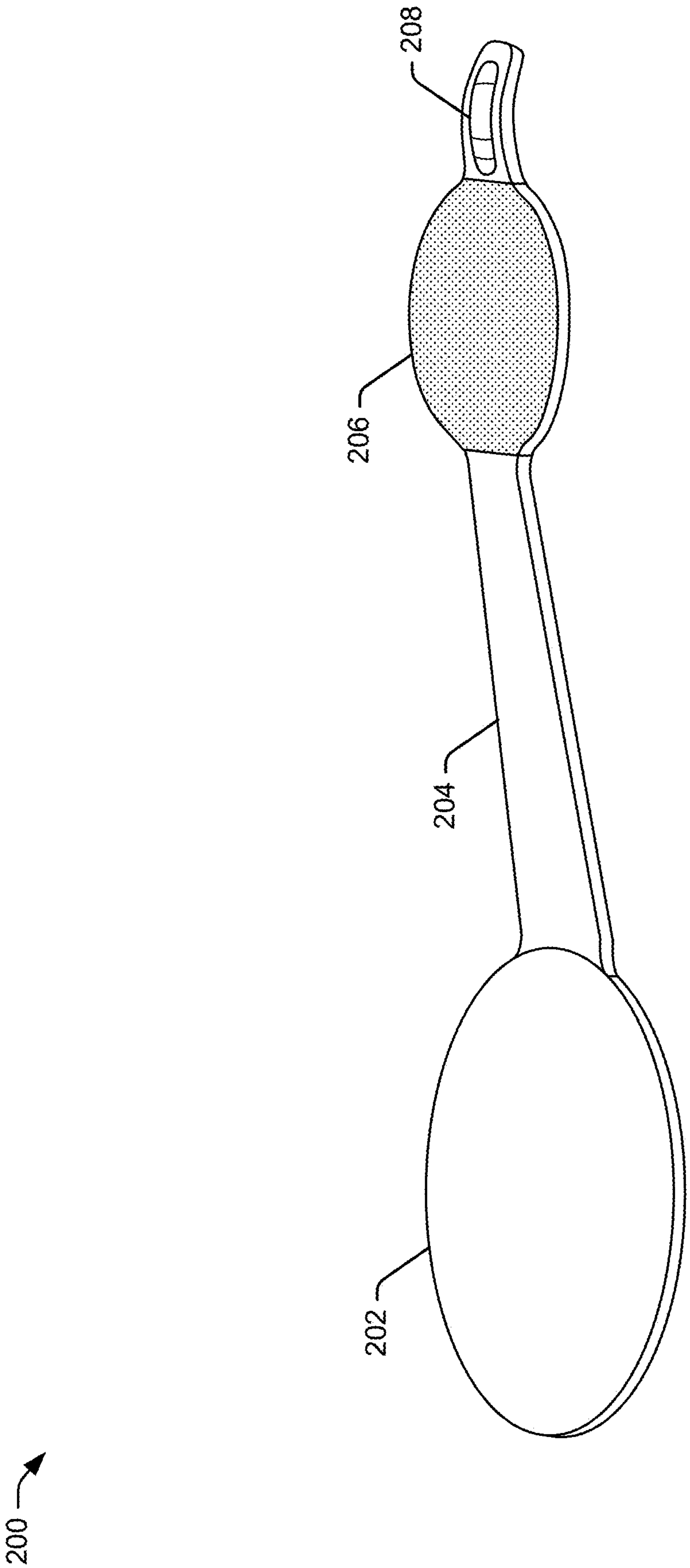
FIG. 2 illustrates a perspective view of an example implementation of a force distributing spring contact in accordance with one or more aspects.

FIG. 2 illustrates a perspective view of an example implementation of a force distributing spring contact 200 in accordance with one or more aspects. As illustrated, the spring contact 200 includes a base 202, a flexure 204, a force distributor 206, and a contact pin 208. In the example implementation, the base 202 is configured to operably couple the spring contact 200 to a first component (not shown). The operable coupling to the first component by the base 202 can be a welded connection, a press-fit connection, a screwed connection, a soldered connection, and so forth. Additionally, the base 202 is formed of an electrically conductive material. Although a circular shape is illustrated in FIG. 2, the shape of the base 202 can be any appropriate three-dimensional shape configured to couple the spring contact 200 to the first component.

In the example implementation of the spring contact 200, a first end of the flexure 204 is coupled to the base 202 and a second end of the flexure 204 is coupled to the force distributor 206. Like the base 202, the flexure 204 is formed of an electrically conductive material. Additionally, as illustrated in FIG. 2, the flexure 204 is configured as a lever spring having a trapezoidal shape. However, the flexure 204 can be realized as any one of a variety of springs and shapes configured to apply a spring force. The variety of springs can include a leaf spring, a conical spring, a helical compression spring, a torsion spring, a laminated spring, a disc spring, and so forth. The variety of shapes can include shapes that are rectangular, ovular, circular, conical, and the like.

The contact pin 208 is coupled to the force distributor 206 and configured to operably couple the spring contact 200 to a second component (not shown). The operable coupling of the contact pin 208 to the second component is a pressure coupling (e.g., from the spring force applied by the flexure 204). As illustrated, the contact pin 208 may include a structure configured to provide a precise connection to the second component. Although a single, elongated dome structure is illustrated, the structure can include any number of any appropriate shape configured to provide the precise connection to the second component, including conical or pointed shapes. Further, the contact pin 208 and the elongated dome structure thereof can be formed of any one of a variety of conductive materials.

FIG. 2 illustrates the force distributor 206 as a structure coupled to the flexure 204 and the contact pin 208 between the two. Although a flat, circular structure is illustrated, the structure can be not flat, depending on a mating surface of the second component, and a variety of shapes (e.g., circular, rectangular, square, polygonal, ovular). The force distributor 206 can be formed of a variety of materials, including conductive and non-conductive materials (e.g., insulative materials, dielectric materials), so long as a surface contacting the second component is not conductive. For example, the force distributor 206 can be formed of aluminum with an insulative paint coating. As additional examples, the force distributor 206 can be coated in other non-conductive materials, including plastic, foam, rubber, or composites thereof. Additionally, or alternatively, the force distributor 206 can be formed wholly of a non-conductive material.

As illustrated, the force distributor 206 may include a surface area that is larger than a surface area of the contact pin 208. In some situations, an excess force can be applied to the second component. In such situations, the force distributor 206 contacts a mating surface of the second component and reduces a pressure applied to the second component by distributing the excess force over the larger surface area. The reduced pressure may help protect the second component from damage and the reduced pressure may also enable the force distributing spring contact 200 to be utilized in a variety of environmental (e.g., accidental drops, varying temperatures) and tolerance (e.g., supplier capability) situations.

Figure 3:
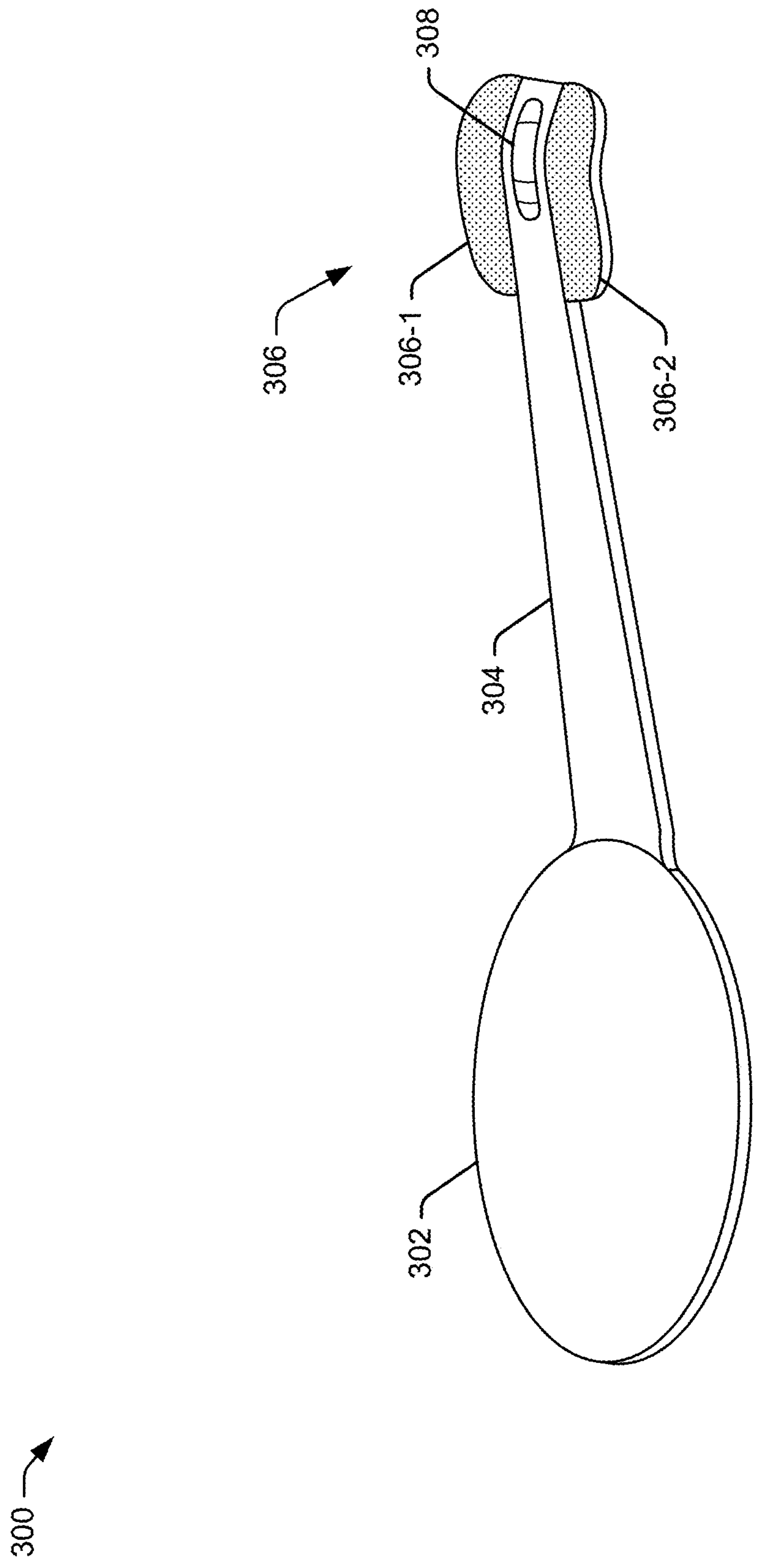
FIG. 3 illustrates a perspective view of another example implementation of a force distributing spring contact in accordance with one or more aspects.

FIG. 3 illustrates a perspective view of another example implementation of a force distributing spring contact 300 in accordance with one or more aspects. The spring contact 300 includes a base 302, a flexure 304 coupled to the base 302, a force distributor 306 coupled to the flexure 304, and a contact pin 308 coupled to the flexure 304. The base 302, the flexure 304, and the contact pin 308 are similar to the base 202, the flexure 204, and the contact pin 208, respectively, in the example implementation of a spring contact 200 illustrated in FIG. 2 and described above. However, the force distributor 306 in the example implementation of FIG. 3 is different, as detailed below.

As illustrated in FIG. 3, the force distributor 306 includes a first force distributor 306-1 and a second force distributor 306-2, both of which are coupled to the flexure 304 and on opposite sides of the contact pin 308. The first force distributor 306-1 and the second force distributor 306-2 include first and second surface areas, respectively. The first and second surface areas can be equivalent, as illustrated, or not equivalent, depending on a specific application of the spring contact. Beyond the force distributor 306 being separated into the first force distributor 306-1 and the second force distributor 306-2, the purpose and materials of the force distributor 306 are like those of the force distributor 206 as described with reference to FIG. 2. That is, the force distributor 306 distributes an excess force over a larger surface area to prevent damage to a component (e.g., the second component) and is non-conductive (e.g., made of plastic, coated with paint).

Figure 4A:
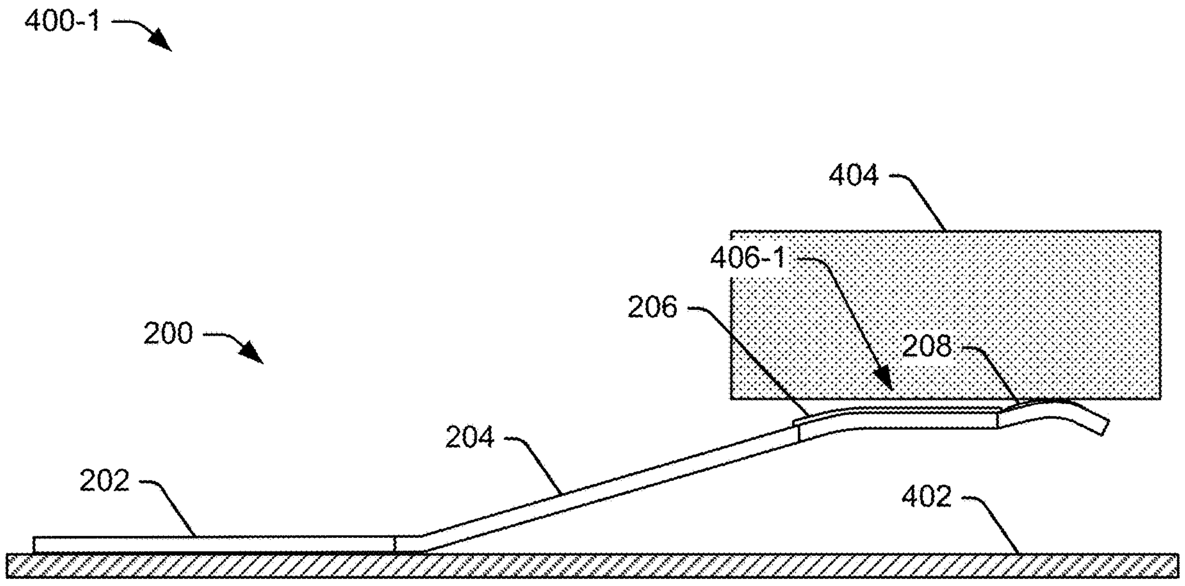
FIG. 4A illustrates a cross-sectional view of the example implementation of the force distributing spring contact of FIG. 2 under a first contact force.

FIG. 4A illustrates a cross-sectional view 400-1 of the example implementation of the spring contact 200 with force distribution from FIG. 2 under a first contact force. As illustrated, the spring contact 200 includes the base 202, the flexure 204, the force distributor 206, and the contact pin 208. Further illustrated are a first component 402 (e.g., first component 110 of FIG. 1) and a second component 404 (e.g., second component 112 of FIG. 1). The base 202 is operably coupled to the first component 402 (e.g., by a press-fit connection, by a soldered connection) and the contact pin 208 is operably coupled to the second component 404 (e.g., by pressure).

In aspects, the first contact force is a force necessary to make the operable coupling between the contact pin 208 and the second component 404 a reliable, electrical connection. As illustrated, the first contact force is sufficient to operably couple the contact pin 208 to the second component 404 while leaving a gap between the force distributor 206 and the second component 404, as indicated by arrow 406-1.

Figure 4B:
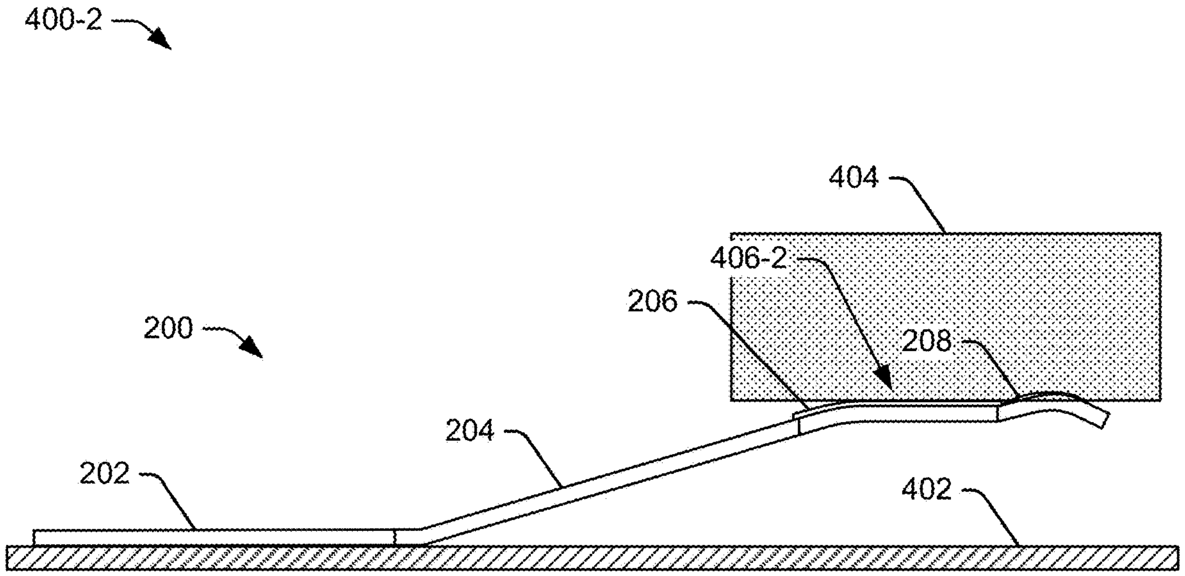
FIG. 4B illustrates a cross-sectional view of the example implementation of the force distributing spring contact of FIG. 2 under a second contact force.

FIG. 4B illustrates a cross-sectional view 400-2 of the example implementation of the force distributing spring contact 200 from FIG. 2 under a second contact force. The spring contact includes the base 202, the flexure 204, the force distributor 206, and the contact pin 208. FIG. 4B also illustrates the first component 402 and the second component 404. The base 202 is operably coupled to the first component 402 via, for example, a welded connection or a screwed connection. The contact pin 208 is operably coupled to the second component 404 via a pressure applied by a spring force of the flexure 204.

The second contact force is a force greater than the first contact force and, accordingly, a gap between the force distributor 206 and the second component 404 is not present, as indicated by arrow 406-2. Thus, the force distributor 206, like the contact pin 208, is operably coupled to the second component 404 and distributes the second contact force over a larger surface area of the second component 404. By so doing, a pressure applied to the second component 404 is reduced sufficiently enough to prevent damage to the second component 404.

Generally, the examples of the force distributing spring contacts provided in this document include one flexure, coupled to which are the force distributor and the contact. Alternatively, however, a force distributing spring contact may include a first flexure and a second flexure. The force distributor, for example, can be coupled to the first flexure and the contact can be coupled to the second flexure. In other examples, a force distributing spring contact can include more than two flexures, one or more bases, one or more force distributors, and/or one or more contacts.

CONCLUSION

Although concepts of techniques and apparatuses directed to force distributing spring contacts have been described in language specific to techniques and/or apparatuses, it is to be understood that the subject of the appended claims is not necessarily limited to the specific techniques or apparatuses described. Rather, the specific techniques and apparatuses are disclosed as example implementations of force distributing spring contacts.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A computing device comprising:
- a first component;
- a second component; and
- a spring contact comprising:
  - a base configured to operably couple the spring contact to the first component;
  - at least one flexure coupled to the base;
  - a force distributor coupled to the at least one flexure on an end opposite of the base; and
  - a contact pin coupled to the at least one flexure on the end opposite of the base and configured to operably couple the spring contact to the second component,
- wherein at least one of the at least one flexure, the force distributor, or the contact pin is not electrically conductive.

2. The computing device of claim 1,
- wherein the base is configured to operably couple the spring contact to the first component by a soldered connection,
- wherein the first component is a printed circuit board, and
- wherein the second component is a display module.

3. The computing device of claim 1, wherein the force distributor is coupled between the at least one flexure and the contact pin.

4. The computing device of claim 1,
- wherein the force distributor comprises a first force distributor and a second force distributor, and wherein the contact pin is disposed between the first force distributor and the second force distributor.

5. The computing device of claim 1, wherein the base is electrically conductive, wherein the at least one flexure is electrically conductive, wherein the force distributor is not electrically conductive, and wherein the contact pin is electrically conductive.

6. The computing device of claim 5, wherein the operable coupling of the base and the first component comprises an electrical coupling, wherein the operable coupling of the contact pin and the second component comprises an electrical coupling, and wherein the spring contact electrically couples the first component to the second component.

7. The computing device of claim 1, wherein the contact pin comprises a first surface area, wherein the force distributor comprises a second surface area, and wherein the second surface area is larger than the first surface area.

8. The computing device of claim 7, wherein the force distributor is configured to reduce a pressure applied to the second component by distributing a force over the second surface area, and wherein the contact pin comprises at least one of:

a domed structure; or a pointed structure.

9. A computing device comprising:

a first component;

a second component; and a spring contact comprising:

a base configured to operably couple the spring contact to the first component;

at least one flexure coupled to the base;

a force distributor coupled to the at least one flexure on an end opposite of the base; and a contact pin coupled to the at least one flexure on the end opposite of the base and configured to operably couple the spring contact to the second component, wherein the force distributor comprises a first force distributor and a second force distributor, and wherein the contact pin is disposed between the first force distributor and the second force distributor.

10. The computing device of claim 9, wherein the base is configured to operably couple the spring contact to the first component by a soldered connection, wherein the first component is a printed circuit board, and wherein the second component is a display module.

11. The computing device of claim 9, wherein the contact pin comprises a first surface area, wherein the force distributor comprises a second surface area, and wherein the second surface area is larger than the first surface area.

12. The computing device of claim 11, wherein the force distributor is configured to reduce a pressure applied to the second component by distributing a force over the second surface area, and wherein the contact pin comprises at least one of:

a domed structure; or a pointed structure.

13. The computing device of claim 9, wherein:

at least one of the at least one flexure, the base, the first force distributor, the second force distributor, or the contact pin is not electrically conductive.

14. The computing device of claim 13, wherein the at least one flexure is electrically conductive, wherein the first or second force distributor is not electrically conductive, and wherein the contact pin is electrically conductive.

15. The computing device of claim 14, wherein the operable coupling of the base and the first component comprises an electrical coupling, wherein the operable coupling of the contact pin and the second component comprises an electrical coupling, and wherein the spring contact electrically couples the first component to the second component.

* * * * *